INVENTOR
A. H. BOBECK
BY William H. Kamstra
ATTORNEY

Aug. 2, 1966 A. H. BOBECK 3,264,620

MAGNETIC MEMORY CIRCUIT

Filed Sept. 13, 1962 2 Sheets-Sheet 2

INVENTOR
A. H. BOBECK
BY William H. Kamstra
ATTORNEY

United States Patent Office 3,264,620
Patented August 2, 1966

3,264,620
MAGNETIC MEMORY CIRCUIT

Andrew H. Bobeck, Chatham, N.J., assignor to Bell Telephone Laboratories, Incorporated, New York, N.Y., a corporation of New York Filed Sept. 13, 1962, Ser. No. 223,483
7 Claims. (Cl. 340—174)

This invention relates to information storage circuits and more particularly to such circuits in which magnetic means are employed as information bit storage elements.

Information storage circuits or memory units, as they are frequently termed, are well known in the information handling art. Magnetic cores were found early to be convenient information bit storage elements for such information storage circuits because of their ability to remain controllably in either of two stable magnetic states.

Many well known memory units are word organized such that a plurality of cores constitute a word address. One advantageous mode for setting the magnetic state of the various cores of such a plurality of cores is by applying to each core word-write and digit-write pulses simultaneously. As a result of the magnetic forces applied by such pulses, preselected cores are driven to positive remanence when such simultaneous pulses add and remain essentially in their prior magnetic state when such pulses subtract, thus writing in or storing in the word address a binary representation of information.

One magnetic core per bit is conventionally found satisfactory for each bit storage element in a memory circuit driven by such simultaneous pulses during the write phase. However, certain limitations attend the use of the single core. An example of these limitations is the fact that the word-write and digit-write pulses applied simultaneously for setting the magnetic state of a core each is advantageously of a magnitude less than the switching threshold of the core. As is known, this is necessary to achieve the required selectivity among the bit cores during the write phase. In some instances, however, the write pulses vary in amplitude with the result that a core in which a binary "zero" is to be stored, for example, is caused to undergo some undesired flux excursion. In a subsequent read phase, the latter core, rather than being merely shuttled, is then partially switched, producing an output signal and thereby presenting the problem of distinguishing between such spurious signals and the full valued output signals generated by a properly switching core. A further example of these limitations is the fact that there is a maximum frequency at which a core can be operated which frequency is a function of the energy by which the core is switched.

The limitations have been overcome to a large degree by the use of two cores per bit and appropriate connective circuitry now well known in the art. More specifically, a "two-core-per-bit" arrangement permits the word-write pulse to exceed the switching threshold because the output signal in such a case is positive or negative rather than of one polarity and of differing magnitudes as is the case with one core per bit. Additionally, the two-core-per-bit arrangement is capable of operation at a frequency greater than that of the one-core-per-bit arrangement because the excess energy over and above that necessary to switch the magnetic state of the core may be much larger than in the one-core-per-bit arrangement. However, the additional core per bit is accompanied by a corresponding increase in the cost of such memory units.

It is an object of this invention to achieve the advantages inherent in two-core-per-bit operation while employing only a single core at each bit address in a word-organized memory.

It is another object of this invention to reduce the number of cores in a magnetic core memory operated on a two-core-per-bit basis and thus achieve economies not heretofore possible.

It is a further object of this invention to achieve a new and improved magnetic core memory matrix.

The foregoing and other objects of this invention are realized in one illustrative embodiment wherein one reference core and, in addition, a plurality of cores constituting a word address are arranged sequentially and are inductively coupled in the same sense to a write-read circuit. Additionally, each core of the stored word is inductively coupled in the same sense to a digit circuit. The write-read circuit and the digit circuit are connected to synchronized pulse generators for applying simultaneous pulses thereto. Further, the cores of the word address, hereinafter termed the bit cores, are inductively coupled all in the same sense to a sensing circuit in conventional fashion. However, instead of the sensing circuit being connected directly to ground as is customary in the absence of the reference core, the circuit is inductively coupled in a sense opposite to that of the bit cores to the reference core and then to ground.

In response to pulses applied simultaneously to the write-read and digit circuits, the bit cores are driven to positive remanence or remain on the prior magnetic state, typically a negative remanence, that is, a stored "one" or stored "zero" condition, respectively, depending on whether the simultaneous pulses add or subtract. In addition, the word-write pulse drives simultaneously the reference core to a magnetic state intermediate positive or negative remanence. A read pulse, subsequently applied to the word-read circuit, produces, for a stored "one," an output pulse of a polarity opposite to that of the reference core and, for a stored "zero," an output pulse of the same polarity as that of the reference core.

Thus, in accordance with this invention, it is a feature thereof that one reference magnetic core be associated with the plurality of bit cores constituting a single word address, which reference core provides a voltage reference level with respect to which the output of a single bit core registers either positive or negative.

A further feature of this invention is that there be connected to a single reference core and the bit cores of a word address associated therewith a means for magnetizing each bit core to a magnetic state corresponding to a stored "one" or a stored "zero" and for providing in the reference core prior to read out a magnetic state intermediate that of a stored "one" or a stored "zero."

A more specific feature of this invention is a memory circuit including means for applying prior to read out simultaneous word-write and digit-write pulses to the bit cores of a word address and for applying simultaneously a word-write pulse to a reference core associated with the bit cores.

A further feature of this invention is a new and improved magnetic memory matrix including a plane of reference cores each of which when activated provides a voltage reference level with respect to which the output of the bit cores of a word address registers either positive or negative output signals when sensed.

The foregoing and other objects and features of this invention will be better understood from a consideration of the following detailed description rendered in conjunction with the accompanying drawing, wherein.

It is to be understood that the figures are not necessarily to scale, certain dimensions being exaggerated conveniently for purposes of illustration.

Figure 1:
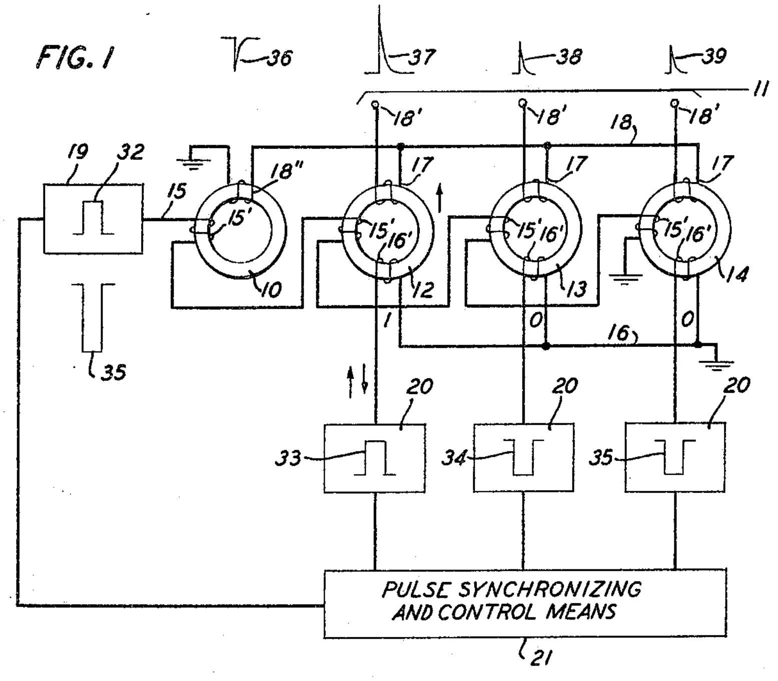
FIG. 1 depicts a word memory circuit according to the present invention having a single reference core associated therewith.

In FIG. 1, there is illustrated a toroidal magnetic reference core 10 and a word address 11 comprising a plurality of toroidal storage magnetic bit cores 12, 13 and 14 with which the reference core is associated. Each of the reference and bit cores may be of the well known type exhibiting substantially rectangular hysteresis characteristics. Write-read circuit 15 includes a winding 15' inductively coupled in the same sense to each of the reference and bit magnetic cores and is at one end connected to ground. A digit circuit 16 includes in parallel a select winding 16' inductively coupled in the same sense to each of the bit cores and is also connected at one end to ground. Similarly, a separate sensing winding 17 is inductively coupled in the same sense to each of the bit cores. Each of the windings 17 is connected at one end to a common conductor 18 and at the other end to terminals 18' to expedite interconnection with appropriate utilization circuitry. Conductor 18 includes a winding 18'' inductively coupled to the reference core 10 in a sense opposite to that of the sensing windings 17 and in the same sense as the write-read windings and then to ground. Pulse generating means 19 and 20 are connected to the other end of the write-read circuit 15 and to each of the digit windings, respectively. Pulse synchronizing and control means 21 is connected to all the pulse generating means for permitting simultaneous activation thereof during the write phase. Pulse generating and synchronizing means are well known in the art and for simplicity here are designated only by block diagrams. The magnitudes and polarities of the pulses generated are described more fully hereinafter.

Figure 2:
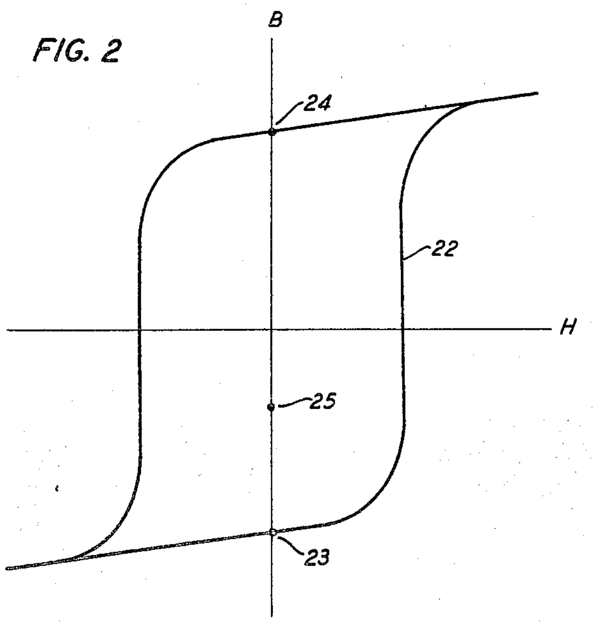
FIG. 2 depicts an idealized hysteresis loop for a magnetic core of FIG. 1.
Figure 3:
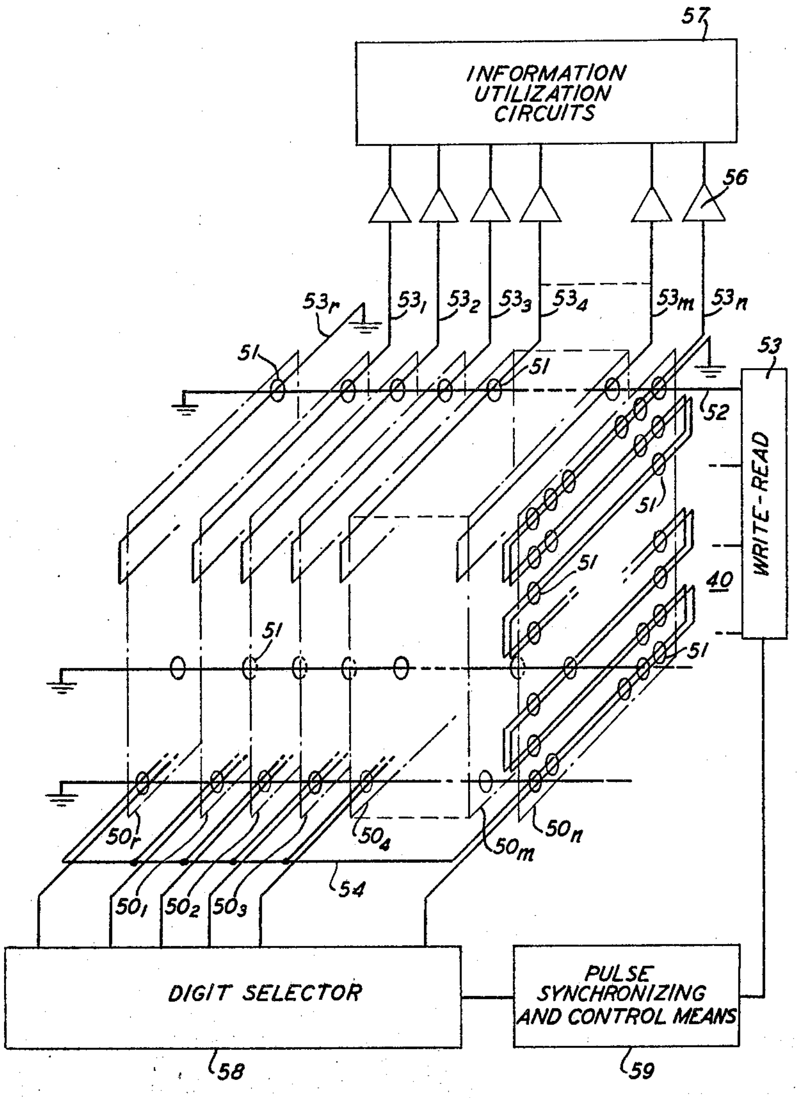
FIG. 3 depicts a three-dimensional memory matrix organized in accordance with the principles of the present invention.

The operation of the arrangement of FIG. 1 can be described conveniently in terms of the idealized hysteresis loop depicted in FIG. 2. Further, for purposes of illustrating a typical operation, it will be assumed that a binary "one" is to be stored in core 12 and that binary "zeros" are to be stored in cores 13 and 14. To this end, initially during the write phase, various pulse inputs to the write-read and digit circuits are necessary and subsequently during the read phase to be described later certain pulse outputs are realized in the sensing circuit. These pulses in idealized form are depicted at various points in FIG. 1 and are described more fully hereinafter.

Specifically, the curve 22 is a typical B–H curve for a typical magnetic element such as the magnetic cores of FIG. 1. Although either condition of remanence may be assumed, in the present operation it will be assumed that the initial magnetic state of each of the reference and bit magnetic cores is at point 23. During every write phase, a positive word-write pulse 32 having an amplitude one-half that necessary to switch the magnetization of any core, conventionally termed a half-select pulse, is applied to the write-read circuit 15. Simultaneously, under the control of pulse synchronizing and control means 21, a positive half-select digit-write pulse 33 and negative half-select digit-write pulses 34 and 35 are applied to the digit winding 16' associated with cores 12, 13 and 14, respectively, in accordance with the above assumptions. As a consequence of the combination of magnetic forces applied by the pulses, core 12 receives two positive half-select pulses and switches whereas cores 13 and 14 each receive one positive and one negative half-select pulse which cancel each other. Thus at the termination of the word-write and the digit-write pulses, core 12 is in a magnetic state shown at point 24 whereas cores 13 and 14 will remain in a magnetic state shown at point 23. The reference core 10 receives only one half-select pulse because it is not coupled to the digit circuit. Thus, at the termination of the word-write pulse, core 10 is in a magnetic state somewhere between points 23 and 24, for example at point 25.

Subsequently, during the read phase, a full-select negative read pulse 35 is applied to the write-read circuit 15. Source 19 is thus further characterized, as distinguished from the sources 20, as also producing the pulse 35 which is of opposite polarity and double the amplitude of the previously mentioned pulse 32. The reference core 10 is driven into negative saturation resulting in a negative output voltage pulse 36 induced across winding 18''. Core 12 switches, producing a large positive voltage pulse 37 induced across its associated winding 17, said pulse having an amplitude greater than that of pulse 36 because of its greater flux excursion. Cores 13 and 14 are shuttled from their negative remanence condition into negative saturation and, because of these small flux excursions, result in small shuttle voltage pulses 38 and 39, respectively, having amplitudes smaller than that of pulse 36. These shuttle pulses are induced across the corresponding windings 17. The output pulses of the various bit cores are added algebraically to the simultaneous output pulse of the reference core by the sensing circuit. Thus, the algebraic sum of pulses 36 and 37 is positive while the sums of pulses 36 and 38 and 36 and 39 are negative because of the differences in the amplitudes of the various pulses.

For convenience, half-select write pulses were used in the description of the operation of the arrangement of FIG. 1. However, the digit-write and the word-write pulses may vary over a range of amplitudes. As is well known, the digit-write pulse may have an amplitude essentially no larger than the half-select pulse. On the other hand, the digit-write pulse need have an amplitude only as large as is necessary to result in the switching of a core when added to the word-write pulse. The word-write pulses can have amplitudes larger than the half-select pulse so long as the magnetization of the reference core is switched to a magnetic state intermediate a stored "one" and a stored "zero" and the word-write pulse alone is insufficient to switch a core. The larger the pulse amplitudes the higher the frequency at which the magnetic core is switched.

The arrangement of FIG. 1 is adapted easily as the basic unit upon which three-dimensional information storage matrices or memories may be fabricated. An illustrative three-dimensional memory matrix 40 embodying the principles of this invention as shown generally in FIG. 1 comprises a plurality of information planes $\mathbf{50}_1$, $\mathbf{50}_2$, $\mathbf{50}_3$, $\mathbf{50}_4$ . . . $\mathbf{50}_m$, $\mathbf{50}_n$ and a reference plane $\mathbf{50}_r$. The planes 50 and $\mathbf{50}_r$ are depicted generally only in symbolic form with only so much detail as is necessary for a complete understanding of this invention. Each of the planes 50 and $\mathbf{50}_r$ comprises a plurality of magnetic toroidal cores 51 which are arranged in rows and columns to present a coordinate array so that each core of a plane may be defined positively by a row and column coordinate. In accordance with the well known organization of coordinate array matrices generally, the elements of the rows and columns of each of the planes 50 and $\mathbf{50}_r$ are inductively coupled by way of windings to a write-read circuit. For simplicity, these windings are omitted and the elements are shown threaded by coordinates coincident current word write-read conductors 52 in the conventional manner. The conductor 52 is connected at one end to a write-read pulse generator 53 and at the other end to ground. Similarly, hereinafter, the windings of the various circuits are omitted for simplicity.

The planes $\mathbf{50}_1$ and $\mathbf{50}_n$ are organized so that the corresponding cores of each of the planes constitute bit addresses for the information word across adjacent planes. In this organization a single sensing conductor is associated with each plane and serially threads the cores of the associated plane in one direction along the adjacent rows of the plane such that the desired polarity of the output current generated by a switching core of each row of a plane will be the same. In this manner, the sensing conductors $53_1$ through $53_n$ and the sensing conductor $53_r$ thread the cores of the planes $50_1$ through $50_n$ and $53_r$ respectively. Each of the sensing conductors $53_1$ through $53_n$ terminates at one end in a conductor 54 and at the other end through a read detection amplifier 56 to compatible utilization circuitry 57 well known in the art. Sensing conductor $53_r$ is connected from conductor 54 at one end to ground at the other end. In similar fashion, although in the opposite direction, a single digit conductor serially threads the cores of the associated plane in one direction along the adjacent rows of the plane with respect to the polarity of current as mentioned in connection with the sensing conductor. Each of the digit conductors terminates at ground on one end and to a digit-write pulse generator 58 at the other end. Simultaneous activation of the write-read and digit conductors is accomplished by conventional means 59 shown in block diagram form for simplicity.

The invention has been described in terms of magnetic cores. However, any magnetic element which provides, or within which can be provided, a bit address is adaptable in accordance with this invention. Examples of suitable magnetic elements are the "twistor" and the "waffle iron" described respectively in copending applications Serial No. 675,522 filed August 1, 1957, for A. H. Bobeck, and Serial No. 215,318 filed August 7, 1962, for A. H. Bobeck and J. L. Smith.

No effort has been made to exhaust the possible embodiments of this invention. It will be understood that the embodiments described are merely illustrative of the principles of this invention and various modifications may be made therein by one skilled in the art without departing from the scope and spirit of the invention.

What is claimed is:

1. A magnetic memory including a plurality of magnetic elements making up a word address, each of said elements being of a material characterized by a substantially rectangular hysteresis loop, a write-read circuit including write-read windings each inductively coupled to a different one of said elements, a plurality of digit circuits each including a digit winding inductively coupled to a different one of said elements, said write-read circuit and said digit circuits when simultaneously activated determining in corresponding elements a magnetization therein, means for pulsing simultaneously said write-read and said digit circuits, a sensing circuit including a common conductor and a plurality of sensing windings, each of said sensing windings inductively coupled in the same sense to a different one of said elements for sensing changes in the magnetization therein, and a reference element inductively coupled to the write-read circuit and to said common conductor in like sense opposite to that of said sensing windings for determining in response to a subsequent activation of said write-read circuit a voltage reference level with respect to which the sensing circuit registers positive and negative outputs for said elements.

2. A magnetic memory including a plurality of magnetic cores which make up a word address, each of said cores being of a material characterized by a substantially rectangular hysteresis loop, a write-read circuit including write-read windings each inductively coupled to a different one of said cores, a plurality of digit circuits each including a digit winding inductively coupled to a different one of said cores, said write-read circuit and said digit circuits when simultaneously activated determining in corresponding cores a magnetization therein, means for pulsing simultaneously said write-read and said digit circuits, a sensing circuit including a common conductor and a plurality of sensing windings, each of said sensing windings inductively coupled in the same sense to a different one of said cores for sensing changes in the magnetization therein, and a reference core inductively coupled to the write-read circuit and to said common conductor in like sense opposite to that of said sensing windings for determining in response to a subsequent activation of said write-read circuit a voltage reference level with respect to which the sensing circuit registers positive and negative outputs for said cores.

3. A combination in accordance with claim 2 including means for maintaining the amplitude of said pulse applied to said write-read circuit at least as large as that of the pulse applied to said digit circuit and sufficient to switch the magnetization of said reference core to an intermediate magnetic state.

4. In combination, a plurality of storage magnetic cores and a reference magnetic core associated therewith, each of said storage cores and said reference core being of a material characterized by a substantially rectangular hysteresis loop, a first circuit including a plurality of first windings each inductively coupled to a different one of said reference core and said storage cores, a plurality of second circuits each including a second winding inductively coupled to a different one of said storage cores for causing when activated simultaneously with said first circuit a magnetization of the corresponding core, means for activating simultaneously said first and second circuits, a plurality of third windings each inductively coupled to a different one of said storage cores, a common conductor connected to each of said plurality of third windings, said common conductor being inductively coupled to said reference core such that the voltage in each of said plurality of third windings is determined with respect to that of said reference core.

5. In combination, a plurality of storage magnetic cores and a reference magnetic core associated therewith, each of said cores being of a material characterized by a substantially rectangular hysteresis loop, a first circuit including a plurality of first windings each inductively coupled to a different one of said reference core and said storage cores, a plurality of second circuits each including a second winding inductively coupled to a different one of said storage cores, means for applying a pulse of a first polarity to said first circuit, means for applying a pulse of predetermined polarity to predetermined ones of said second windings, means for synchronizing said pulses such that the pulse to said first circuit and the pulses to said second windings occur simultaneously, a third circuit including a plurality of third windings each inductively coupled to a different one of said storage cores, said third circuit including an additional winding inductively coupled to said reference core such that during a read phase of voltage registered by said third circuit for each of said plurality of cores is positive for the cores at which the simultaneously applied pulses were of the same polarity and negative for the cores at which the simultaneously applied pulses were of the opposite polarity, and means for applying a read pulse of a second polarity to said first circuit.

6. A magnetic memory matrix comprising a plurality of storage planes and a reference plane, each of said planes comprising an array of magnetic elements of a material characterized by a substantially rectangular hysteresis loop, said elements being arranged in rows and columns, successive planes of said elements being organized to form a three-dimensional array wherein corresponding elements of successive storage planes constitute a word address, a write-read circuit including a first pulse generator and a plurality of windings each inductively coupled in a particular sense to the elements of a word address and to the corresponding element of the reference plane, one end of said write-read circuit being connected to said first pulse generator, a digit circuit including a second pulse generator and a separate digit winding inductively coupled in said particular sense to each element of a storage plane, said digit circuit being connected to said second pulse generator, a sensing circuit including a separate sensing winding inductively coupled in said particular sense to each of the elements of said storage planes, said sensing circuit being connected to a common conductor, said common conductor being inductively coupled in said opposite sense to all the elements of the reference plane, and a pulse synchronizing and control means connected to said pulse generators for the simultaneous activation thereof.

7. A magnetic memory matrix comprising a plurality of storage planes and a reference plane, each of said planes comprising an array of magnetic cores of a material characterized by a substantially rectangular hysteresis loop, said cores being arranged in rows and columns, successive planes of said cores being organized to form a three-dimensional array wherein corresponding cores of successive storage planes constitute a word address, a write-read circuit including a first pulse generator and a plurality of windings each inductively coupled in a particular sense to the cores of a word address and to the corresponding core of the reference plane, said write-read circuit being connected to said first pulse generator, a digit circuit including a second pulse generator and a separate digit winding inductively coupled in said particular sense to each core of a storage plane, said digit circuit being connected to said second pulse generator, a sensing circuit including a separate sensing winding inductively coupled in said particular sense to each of the cores of said storage plane, said sensing circuit being connected to a common conductor, said common conductor being inductively coupled in said opposite sense to all the cores of the reference plane, and a pulse synchronizing and control means connected to each of said first and second pulse generators for the simultaneous activation thereof.

References Cited by the Examiner

UNITED STATES PATENTS

| | | | |
|---|---|---|---|
| 3,110,017 | 11/1963 | Thornton | 340—174 |
| 3,118,134 | 1/1964 | Dorros et al. | 340—174 |
| 3,130,391 | 4/1964 | Merz | 340—174 |

OTHER REFERENCES

Page 109, March 1961, Publication I: IBM Technical Disclosure Bulletin, "Word-Oriented Memory," by G. D. Bruce and W. T. Siegle, vol. 3, No. 10.

BERNARD KONICK, *Primary Examiner.*

IRVING L. SRAGOW, S. M. URYNOWICZ, *Assistant Examiners.*